(12) United States Patent  
Duan et al.

(10) Patent No.: US 9,317,409 B2
(45) Date of Patent: *Apr. 19, 2016

(54) CREATING BENCHMARK GRAPH DATA

(75) Inventors: Songyun Duan, Pleasantville, NY (US); Anastasios Kementsietsidis, New York, NY (US); Kavitha Srinivas, Rye, NY (US); Octavian Udrea, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/608,434

(22) Filed: Sep. 10, 2012

(65) Prior Publication Data

US 2013/0006984 A1    Jan. 3, 2013

Related U.S. Application Data

(63) Continuation of application No. 13/016,271, filed on Jan. 28, 2011, now Pat. No. 9,244,820.

(51) Int. Cl.
  *G06F 17/30* (2006.01)
  *G06F 11/36* (2006.01)
  *G06F 11/34* (2006.01)

(52) U.S. Cl.
  CPC ........ *G06F 11/3688* (2013.01); *G06F 11/3428* (2013.01); *G06F 11/3684* (2013.01)

(58) Field of Classification Search
  USPC ........................................... 707/736, 999.002
  See application file for complete search history.

(56) References Cited

U.S. PATENT DOCUMENTS

| | | | |
|---|---|---|---|
| 6,178,427 B1 * | 1/2001 | Parker | 707/999.202 |
| 7,251,578 B1 | 7/2007 | Chen et al. | |
| 7,292,969 B1 | 11/2007 | Aharoni et al. | |
| 7,490,094 B2 | 2/2009 | Bamba et al. | |
| 7,552,151 B2 | 6/2009 | Betz et al. | |
| 7,805,580 B2 | 9/2010 | Hirzel et al. | |
| 8,174,540 B1 * | 5/2012 | McLernon et al. | 345/619 |
| 2003/0149934 A1 * | 8/2003 | Worden | 715/239 |
| 2004/0098670 A1 * | 5/2004 | Carroll | 715/243 |
| 2006/0036620 A1 | 2/2006 | Bigwood et al. | |
| 2006/0235837 A1 | 10/2006 | Chong et al. | |
| 2007/0198448 A1 | 8/2007 | Fokoue-Nkoutche et al. | |
| 2007/0233627 A1 | 10/2007 | Dolby et al. | |
| 2007/0255907 A1 | 11/2007 | Zeffer et al. | |
| 2008/0294644 A1 | 11/2008 | Liu et al. | |
| 2009/0253587 A1 | 10/2009 | Fernandez | |

(Continued)

OTHER PUBLICATIONS

Schmidt et al., SP2Bench: A SPARQL Performance Benchmark, IEEE International Conference on Data Engineering, 2009. Retrieved from http://www.informatik.uni-freiburg.de/~mschmidt/docs/sp2b.pdf on Feb. 4, 2013.*

(Continued)

*Primary Examiner* — Cam-Linh Nguyen
(74) *Attorney, Agent, or Firm* — Tutunjian & Bitetto, P.C.

(57) ABSTRACT

According to an aspect of the present principles, a method is provided for generating resource description framework benchmarks. The method includes deriving a resultant benchmark dataset with a user specified size and a user specified coherence from and with respect to an input dataset of a given size and a given coherence by determining which triples of subject-property-object to add to the input dataset or remove from the input dataset to derive the resultant benchmark dataset.

3 Claims, 7 Drawing Sheets

200

(56) References Cited

U.S. PATENT DOCUMENTS

| | | | |
|---|---|---|---|
| 2009/0276479 A1* | 11/2009 | Lucas et al. | 709/201 |
| 2011/0004863 A1 | 1/2011 | Feblowitz et al. | |
| 2011/0055169 A1* | 3/2011 | Yalamanchi | 707/690 |
| 2011/0078104 A1* | 3/2011 | Honkola et al. | 706/47 |
| 2011/0082829 A1* | 4/2011 | Kolovski et al. | 706/55 |
| 2011/0196827 A1* | 8/2011 | Zunger | 707/622 |

OTHER PUBLICATIONS

Lampo et al., How to Benchmark RDF Engines and Not Die Trying, Proceedings of the International Workshop on Evaluation of Semantic Technologies (IWEST 2010). Shanghai, China. Nov. 8, 2010. Retrieved from http://ceur-ws.org/Vol-666/paper6.pdf on Feb. 4, 2013.*

Fokoue, A., et al. "The Summary ABOX: Cutting Ontologies Down to Size" The Semantic Web—ISWC 2006, 5th International Semantic Web Conference, ISWC 2006. Nov. 2006. pp. 1-13.

Groppe, J., et al. "Efficient Processing of SPARQL Joins in Memory by Dynamically Restricting Triple Patterns" Proceedings of the 2009 ACM Symposium on Applied Computing (SAC). Mar. 2009. pp. 1231-1238.

International Search Report and Written Opinion for International Application No. PCT/US2012/020945 mailed May 10, 2012. (12 pages).

* cited by examiner

500

(person0, name, Eric)
(person0, office, BA7430)
(person0, ext, x4402)
(person1, name, Kenny)
(person1, office, BA7349)
(person1, ext, x5304)
(person2, name, Kyle)
(person2, ext, x6282)

(person3, name, Timmy)
(person3, major, C.S.)
(person3, GPA, 3.4)
(person4, name, Stan)
(person4, GPA 3.8)
(person5, name, Jimmy)
(person5, GPA, 3.7)

FIG. 6

CREATING BENCHMARK GRAPH DATA

CROSS-REFERENCE TO RELATED APPLICATIONS

This application is a Continuation application of co-pending U.S. patent application Ser. No. 13/016,271 filed on Jan. 28, 2011, incorporated herein by reference in its entirety.

BACKGROUND

1. Technical Field

The present invention generally relates to resource description framework data and, more particularly, to creating benchmark graph data.

2. Description of the Related Art

The RDF (Resource Description Framework) is quickly becoming the de-facto standard for the representation and exchange of information. This is nowhere more evident than in the recent Linked Open Data (LOD) initiative where data from varying domains like geographic locations, people, companies, books, films, scientific data (genes, proteins, drugs), statistical data, and the like, are interlinked to provide one large data cloud. As of October 2010, this cloud consists of around 200 data sources contributing a total of 25 billion RDF triples. The acceptance of RDF is not limited, however, to open data that are available on the web. Governments are also adopting RDF. Many large companies and organizations are using RDF as the business data representation format, either for semantic data integration, search engine optimization and better product search, or for representation of data from information extraction. Indeed, with search engines such as GOOGLE and YAHOO promoting the use of RDF for search engine optimization, there is clearly incentive for its growth on the web.

One of the main reasons for the widespread acceptance of RDF is its inherent flexibility: A diverse set of data, ranging from structured data (e.g., DBLP to unstructured data (e.g., WIKIPEDIA/DBpedia, where WIKIPEDIA is an example of an online encyclopedia and DBpedia is a project for extracting structured data from information created as part of WIKEPEDIA), can all be represented in RDF. Traditionally, the structuredness of a dataset, which is defined herein to refer to an amount of structure, if any, is one of the key considerations while deciding an appropriate data representation format (e.g., relational for structured and XML for semi-structured data). The choice, in turn, largely determines how we organize data (e.g., dependency theory and normal forms for the relational model, and XML). It is of central importance when deciding how to index it (e.g., B+-tree indexes for relational and numbering scheme-based indexes for XML). Structuredness also influences how we query the data (e.g., using SQL for relational data and XPath/XQuery for XML). In other words, data structuredness permeates every aspect of data management and accordingly the performance of data management systems is commonly measured against data with the expected level of structuredness (e.g., the TPC-H benchmark for relational and the XMark benchmark for XML data). The main strength of RDF is precisely that it can be used to represent data across the full spectrum of structuredness, from unstructured to structured. This flexibility of RDF, however, comes at a cost. By blurring the structuredness lines, the management of RDF data becomes a challenge since no assumptions can be made a-priori by an RDF DBMS as to what type(s) of data it is going to manage. Unlike the relational and XML case, an RDF DBMS has the onerous requirement that its performance should be tested against very diverse data sets (in terms of structuredness).

A number of RDF data management systems (a.k.a. RDF stores) are currently available. There are also research prototypes supporting the storage of RDF over relational (column) stores. To test the performance of these RDF stores, a number of RDF benchmarks have also been developed. For the same purposes of testing RDF stores, the use of certain real datasets has been popularized. While the focus of existing benchmarks is mainly on the performance of the RDF stores in terms of scalability (i.e., the number of triples in the tested RDF data), a natural question to ask is which types of RDF data these RDF stores are actually tested against. That is, we want to investigate: (a) whether existing performance tests are limited to certain areas of the structuredness spectrum; and (b) what are these tested areas in the spectrum. To that end and in particular, we show that (i) the structuredness of each benchmark dataset is practically fixed; and (ii) even if a store is tested against the full set of available benchmark data, these tests cover only a small portion of the structuredness spectrum. However, we show that many real RDF datasets lie in currently untested parts of the spectrum.

SUMMARY

According to an aspect of the present principles, a method is provided for generating resource description framework benchmarks. The method includes deriving a resultant benchmark dataset with a user specified size and a user specified coherence from and with respect to an input dataset of a given size and a given coherence by determining which triples of subject-property-object to add to the input dataset or remove from the input dataset to derive the resultant benchmark dataset.

According to another aspect of the present principles, another method is provided for generating resource description framework benchmarks. The method includes deriving a resultant benchmark dataset with a user specified size and a user specified coherence from and with respect to an input dataset of a given size and a given coherence. The deriving step includes computing respective coins, each representing a respective value by which the coherence of the input dataset increases or decreases with respect to deriving the resultant benchmark dataset, when respectively adding to or removing from the input dataset all triples of subject-property-object with subjects that are instances of types in a plurality of type sets and with properties equal to a particular set of properties. Each of the respective coins is computing with respect to all of the types in only a respective one of the plurality of type sets and with respect to only a respective one of the properties in the particular set of properties. The deriving step further includes determining an amount of the triples, as represented by the respective coins, to be added or removed from the input dataset to derive the resultant benchmark dataset. The deriving step also includes adding or removing the determined amount of the triples from the input dataset so as to derive the resultant benchmark dataset.

According to other aspect of the present principles, respective computer readable storage mediums are provided which include respective computer readable programs that, when executed on a computer causes the computer to perform the respective steps of the aforementioned methods.

According to yet another aspect of the present principles, a system is provided for deriving a resultant benchmark dataset from and with respect to an input dataset of a given size and a given coherence. The system includes a coin calculator for computing respective coins, each representing a respective value by which the coherence of the input dataset increases or decreases with respect to deriving the resultant benchmark dataset, when respectively adding or removing from the input dataset all triples of subject-property-object with subjects that are instances of types in a plurality of type sets and with properties equal to a particular set of properties. Each of the respective coins is computing with respect to all of the types in only a respective one of the plurality of type sets and with respect to only a respective one of the properties in the particular set of properties. The system further includes a triple amount determiner for determining an amount of the triples, as represented by the respective coins, to be added or removed from the input dataset to derive the resultant benchmark dataset with a user specified size and a user specified coherence. The system also includes a triple modifier for adding or removing the determined amount of the triples from the input dataset so as to derive the resultant benchmark dataset.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 5 is a representation 500 of a dataset D to which the present principles may be applied, according to an embodiment of the present principles;

FIG. 6 is a representation 600 of a dataset D' to which the present principles may be applied, according to an embodiment of the present principles;

DETAILED DESCRIPTION OF PREFERRED EMBODIMENTS

Figure 1:
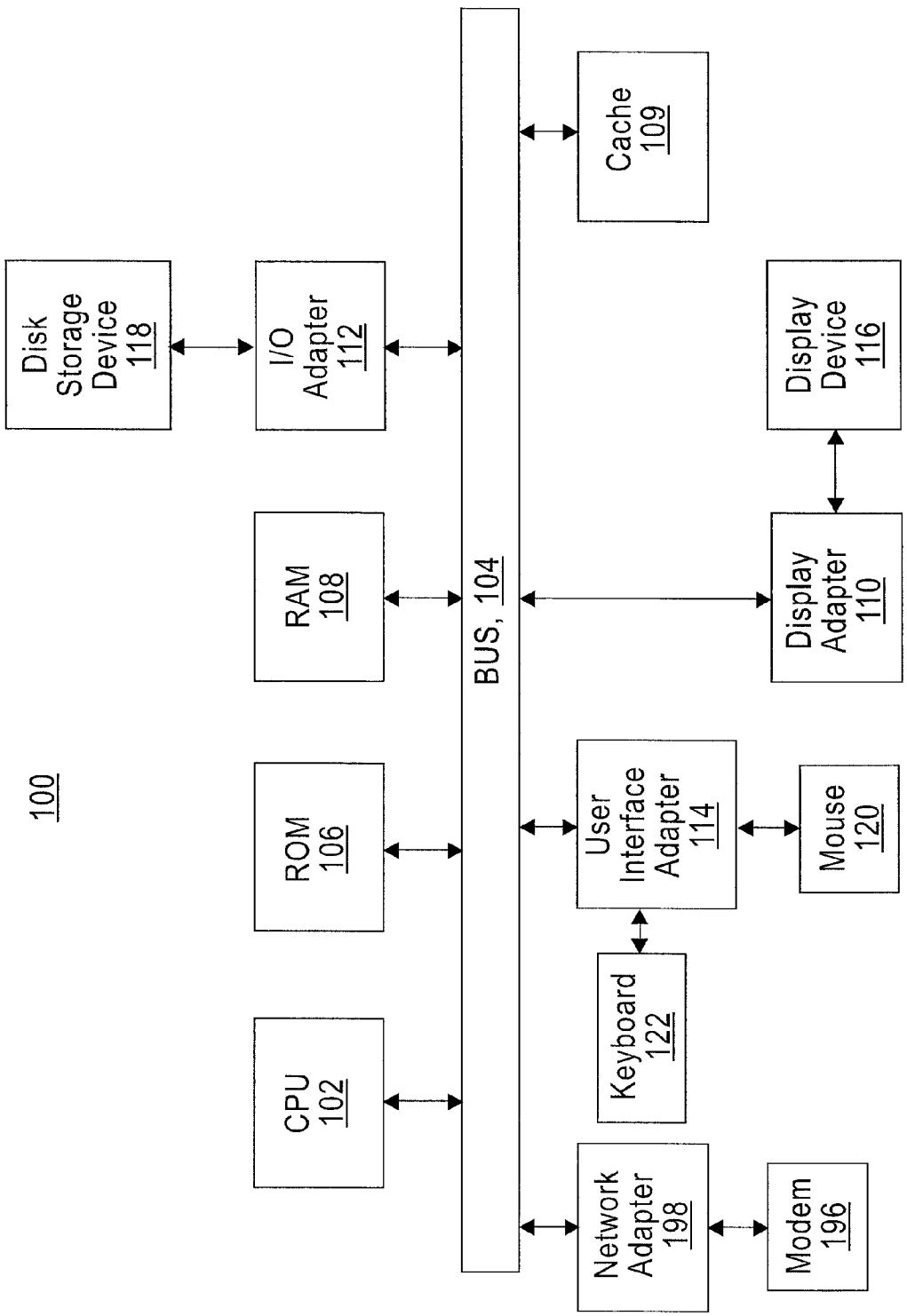
FIG. 1 shows a block diagram illustrating an exemplary computer processing system 100 to which the present principles may be applied, according to an embodiment of the present principles.

As noted above, the present principles are directed to creating benchmark graph data. In consideration of the aforementioned deficiencies of the prior art and, hence, to expand benchmarks to cover the structuredness spectrum, we introduce a novel benchmark data generator with the following unique characteristics: Our generator accepts as input any dataset (e.g., a dataset generated from any of the existing benchmarks, or any real data set) along with a desired level of structuredness and size, and uses the input dataset as a seed to produce a dataset with the indicated size and structuredness. Our data generator has several advantages over existing ones. The first obvious advantage is that our generator offers complete control over both the structuredness and the size of the generated data. Unlike existing benchmark generators whose data domain and accompanying queries are fixed (e.g., LUBM considers a schema which includes Professors, Students and Courses, and the like, along with 14 fixed queries over the generated data), our generator allows users to pick their dataset and queries of choice and methodically create a benchmark out of them. By fixing an input dataset and output size, and by changing the value of structuredness, a user can test the performance of a system across any desired level of structuredness. At the same time, by considering alternative dataset sizes, the user can perform scalability tests similar to the ones performed by the current benchmarks. By offering the ability to perform all the above using a variety of input datasets (and therefore a variety of data and value distributions, as well as query workloads), our benchmark generator can be used for extensive system testing of a system's performance along multiple independent dimensions.

Thus, we note at the onset that while many of the examples provided herein regarding deriving a resultant benchmark dataset from an input dataset relate to the resultant benchmark dataset having at least one of a smaller size and/or a smaller coherence with respect to the input dataset, the present principles are not limited to the same. That is, the present principles apply to increasing or decreasing one or both of the size and coherence of the resultant benchmark dataset with respect to the input dataset. Thus, particularly regarding some of the examples and equations set forth herein directed to decreasing size and/or coherence of the resultant benchmark dataset, a simply inversion of the same readily provides the corresponding solution for increasing size and/or coherence of the resultant benchmark dataset, as is readily apparent to one of skill in the art.

Aside from the practical contributions in the domain of RDF benchmarking, there is a clear technical side to the present principles. In more detail, the notion of structuredness has been presented up to this point in a rather intuitive manner. Herein, we offer a formal definition of structuredness and we show how the structuredness of a particular set can be measured. The generation of datasets with varying sizes and levels of structuredness poses its own challenges. As we show, one of the main challenges is due to the fact that there is an interaction between data size and structuredness: altering the size of a dataset can affect its structuredness, and correspondingly altering the structuredness of a dataset can affect its size. So, given an input dataset and a desired size and structuredness for an output dataset, we cannot just randomly add/remove triples in the input dataset until we reach the desired output size. Such an approach provides no guarantees as to the structuredness of the output dataset and is almost guaranteed to result in an output dataset with structuredness which is different from the one desired. Similarly, we cannot just adjust the structuredness of the input dataset until we reach the desired level, since this process again is almost guaranteed to result in a dataset with incorrect size. Herein, we show that the solution to our benchmark generation problem comes in the form of two objective functions, one for structuredness and one for size, and in a formulation of our problem as an integer programming problem.

Thus, we introduce a formal definition of structuredness and propose its use as one of the metrics for the characterization of RDF data. Using our structuredness metrics, we show that existing benchmarks cover only a small range of the structuredness spectrum, which has little overlap with the spectrum covered by real RDF data.

We develop a principled, general technique to generate an RDF benchmark dataset that varies independently along the dimensions of structuredness and size. We show that unlike existing benchmarks, our benchmark generator can output datasets that resemble real datasets not only in terms of structuredness, but also in terms of content. This is feasible since our generator can use any dataset as input (real or synthetic) and generate a benchmark out of it.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 shows a block diagram illustrating an exemplary computer processing system 100 to which the present principles may be applied, according to an embodiment of the present principles. The computer processing system 100 includes at least one processor (CPU) 102 operatively coupled to other components via a system bus 104. A read only memory (ROM) 106, a random access memory (RAM) 108, a display adapter 110, an I/O adapter 112, a user interface adapter 114, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112.

A mouse 120 and keyboard 122 are operatively coupled to system bus 104 by user interface adapter 114. The mouse 120 and keyboard 122 are used to input and output information to and from system 100.

A (digital and/or analog, wired and/or wireless) modem 196 is operatively coupled to system bus 104 by network adapter 198.

Of course, the computer processing system 100 may also include other elements (not shown), including, but not limited to, a sound adapter and corresponding speaker(s), and so forth, and readily contemplated by one of skill in the art.

Figure 2:
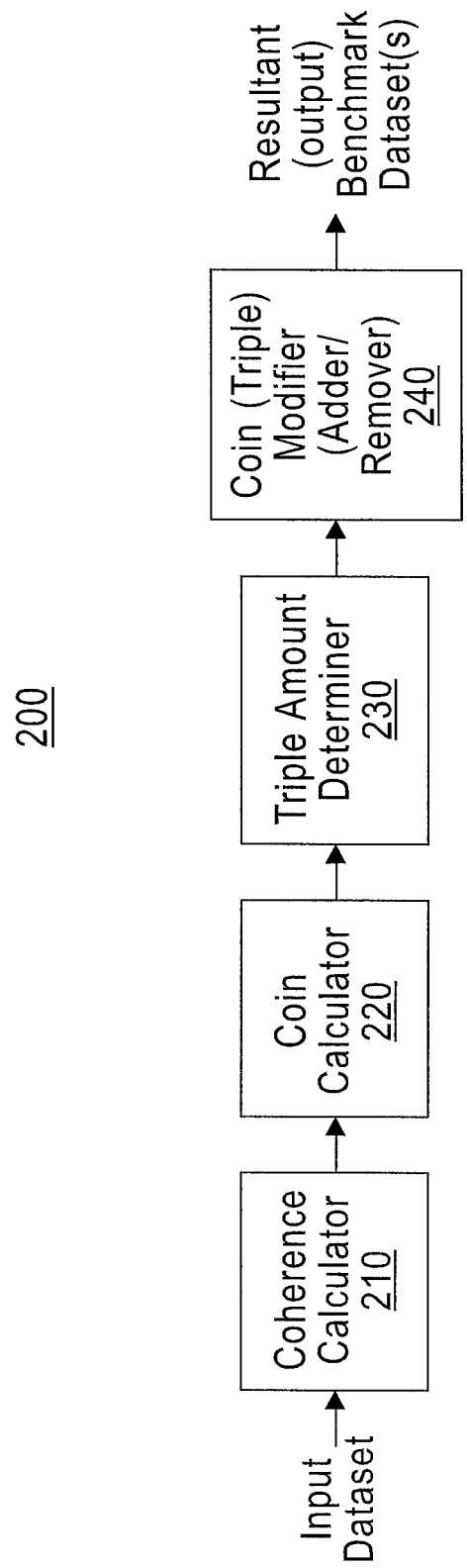
FIG. 2 shows an exemplary system 200 for generating resource description framework benchmarks, according to an embodiment of the present principles.

FIG. 2 shows an exemplary system 200 for generating resource description framework benchmarks, according to an embodiment of the present principles.

The system 200 includes a coherence calculator 210, a coin calculator 220, a triple amount determiner (e.g., which may include but is not limited to an integer programming solver) 230, and a coin (triple) modifier (adder/remover) 240. While the functions performed by the preceding elements are described in detail throughout herein, we specifically point to step 330 of method 300 of FIG. 3 described later herein with respect to element 220 of system 200, step 340 of method 300 with respect to element 230 of system 200, and step 350 of method 300 with respect to element 240 of system 200. Additionally, we specifically point to step 810 of method 800 of FIG. 8 described later herein with respect to elements 210 and 220 of system 200, step 820 of method 800 with respect to element 230 of system 200, and step 840 of method 800 with respect to element 240 of system 200.

It is to be appreciated that system 200 may be implemented by a computer processing system such as computer processing system 100 shown and described with respect to FIG. 1. Moreover, it is to be appreciated that select elements of computer processing system 100 may be embodied in one or more elements of system 200. For example, a processor and requisite memory may be included in one or more elements of system 200, or may be distributed between one or more of such elements. In any event such requisite processing and memory hardware are used in any implementations of system 200, irrespective of which elements use and/or otherwise include the same. Given the teachings of the present principles provided herein, it is to be appreciated that these and other variations and implementations of system 200 are readily contemplated by one of skill in this and related arts, while maintaining the spirit of the present principles.

Figure 3:
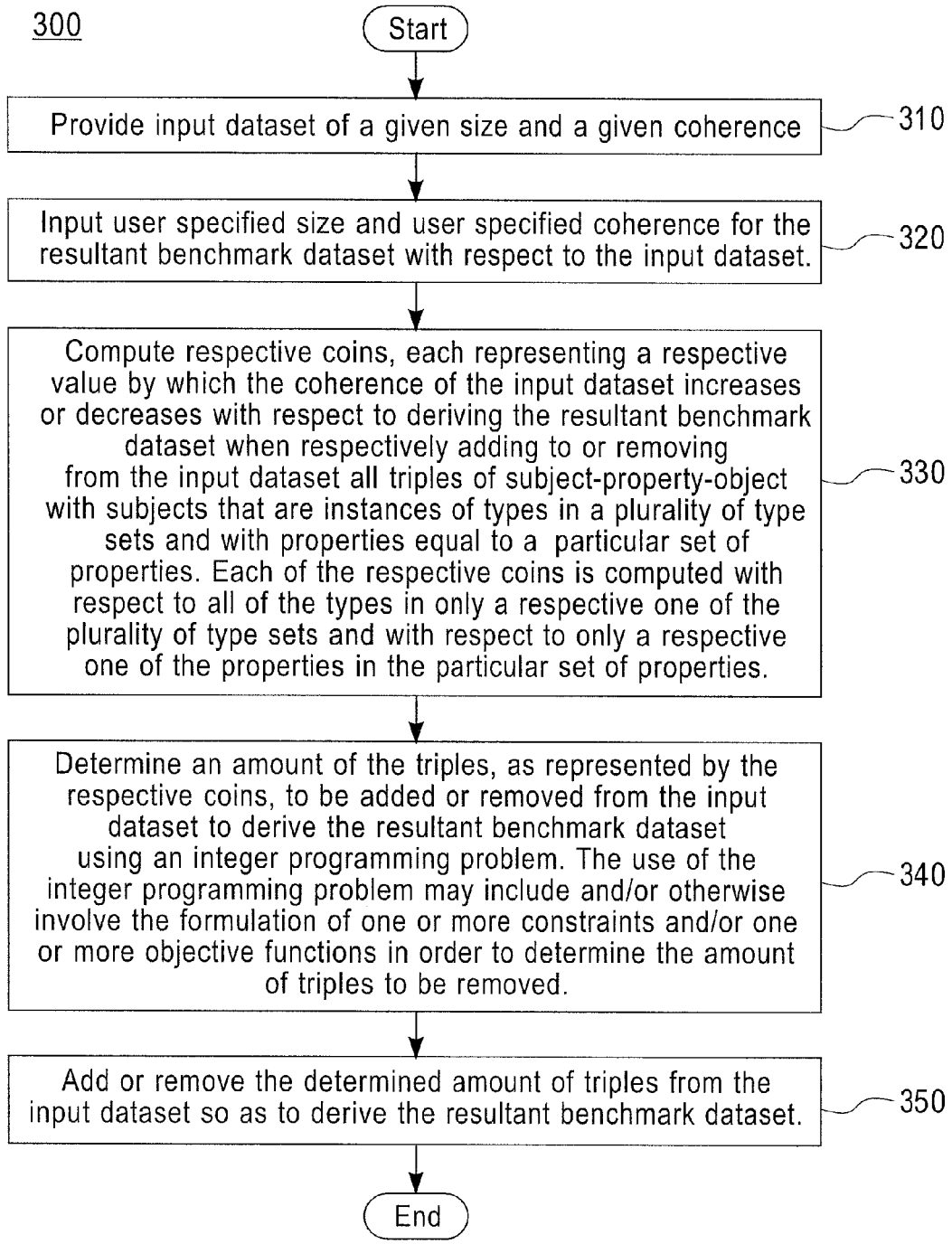
FIG. 3 shows a flow diagram illustrating an exemplary method 300 for generating resource description framework benchmarks, according to an embodiment of the present principles.

FIG. 3 shows a flow diagram illustrating an exemplary method 300 for generating resource description framework benchmarks, according to an embodiment of the present principles. In particular, the method derives a resultant benchmark dataset with a user specified smaller size and a user specified smaller coherence from and with respect to an input dataset of a given size and a given coherence.

Hence, at step 310, an input dataset of a given size and a given coherence is provided (input). At step 320, a user specified size and a user specified coherence are input for the resultant benchmark dataset with respect to the input file.

At step 330, respective coins are computed, each representing a respective value by which the coherence of the input dataset increases or decreases with respect to deriving the resultant benchmark dataset when respectively adding or removing from the input dataset all triples of subject-property-object with subjects that are instances of types in a plurality of type sets and with properties equal to a particular set of properties. In particular, each of the respective coins is computed with respect to all of the types in only a respective one of the plurality of type sets and with respect to only a respective one of the properties in the particular set of properties.

At step 340, an amount of the triples, as represented by the respective coins, to be added or removed from the input dataset to derive the resultant benchmark dataset is determined using an integer programming problem. Regarding step 340, the use of the integer programming problem may include and/or otherwise involve the formulation of one or more constraints and/or one or more objective functions in order to determine the amount of the triples to be removed.

At step 350, the determined amount of the triples are added to or removed from the input dataset so as to derive the resultant benchmark dataset. In the case that triples are added, the new triples may include subject, property or object values that are derived from existing subject, property or object values in the input dataset, or they can include (new) invented subject, property or object values that are not present in the input dataset.

We note that each of the aforementioned steps of method 300 is described in further detail herein below.

We further note, regarding step 330, that in other embodiments of the present principles, as readily contemplated by one of ordinary skill in the art, each of the respective coins need not be computed with respect to all of the types in only a respective one of the plurality of type sets and with respect to only a respective one of the properties in the particular set of properties. That is, variations of the preceding may also be used in accordance with the teachings of the present principles, while maintaining the spirit of the present principles. For example, coins can be computed for only a subset of the types, or only a subset of the properties of a particular type. In this manner, the user can specify that the types or properties for which coins are not computed will remain intact and will not be affected by any further changes in size or coherence.

Moreover, regarding step 340, we note that the present principles are not limited to the use of an integer programming problem and thus, given the teachings of the present principles provided herein, one of ordinary skill in the art will readily contemplate other approaches to performing the size and coherence changes desired in the resultant benchmark dataset, while maintaining the spirit of the present principles. In such cases, the constraints and so forth described herein with respect to the integer programming problem may be used and/or one or more substituted or deleted when other approaches are used. In the end, the goal is to modify the input dataset to derive the resultant benchmark dataset having a user specified size and/or a user specified coherence which differs from that of the input dataset.

Datasets

As noted herein, the present principles are advantageously applied to real or benchmark datasets. Examples of real datasets include, for example, but are not limited to, the DBpedia dataset, the UniProt dataset, the YAGO dataset, the Barton library dataset, the Wordnet dataset, and the Linked Sensor dataset. Examples of benchmark datasets include, for example, but are not limited to, the TPC Benchmark H (TPC-H) dataset, the Berlin SPARQL Benchmark (BSBM) dataset, the Lehigh University Benchmark (LUBM) dataset, and the SP$^2$Bench benchmark data. The preceding and/or other datasets may serve as an input dataset with respect to the present principles.

Figure 4:
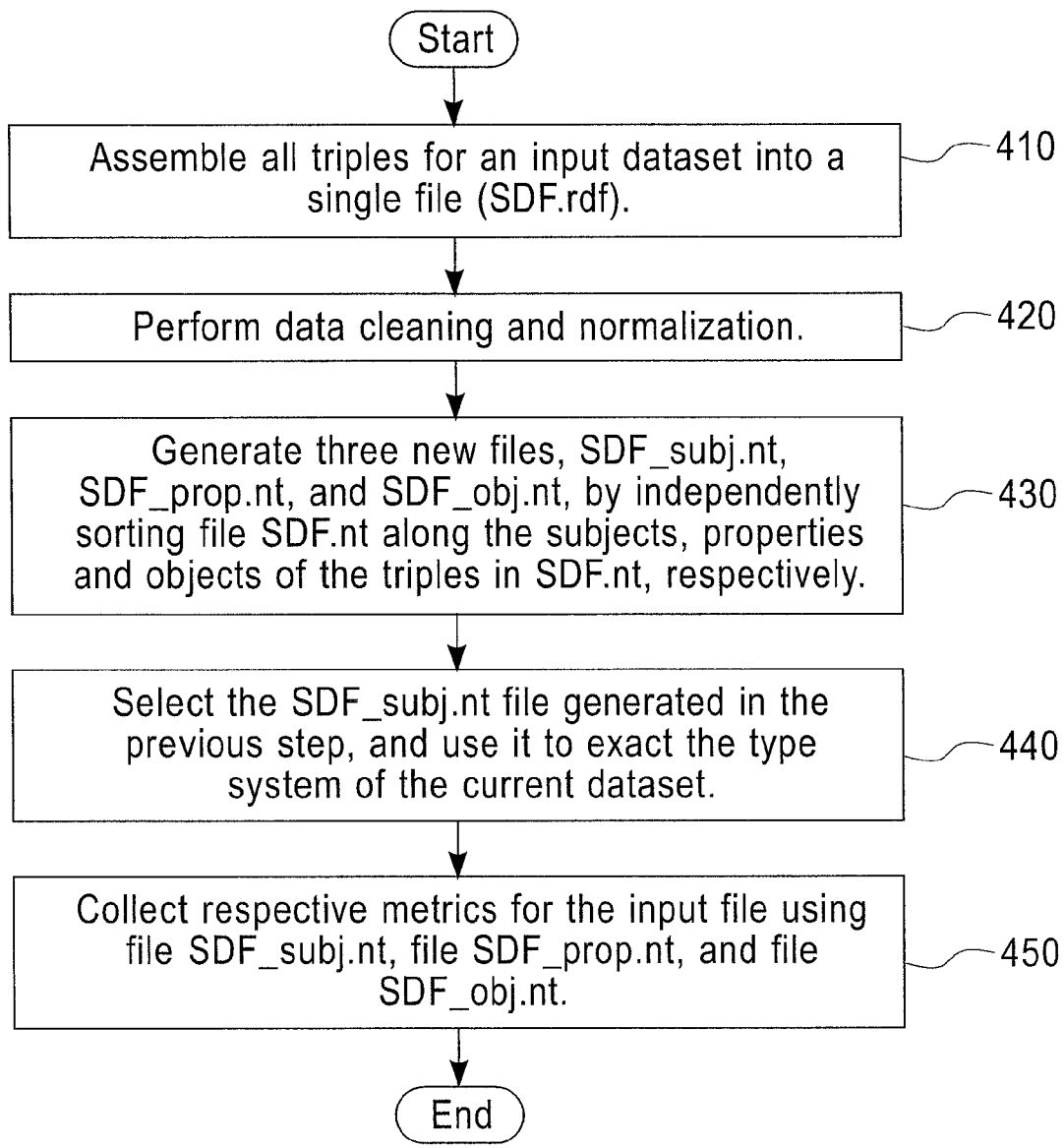
FIG. 4 shows a flow diagram illustrating an exemplary method 400 for collecting metrics for an input dataset, according to an embodiment of the present principles.

FIG. 4 shows a flow diagram illustrating an exemplary method 400 for collecting metrics for an input dataset, according to an embodiment of the present principles. At step 410, all triples for an input dataset are assembled into a single file, referred to as SDF.rdf (Single Dataset File). As step 420, data cleaning and normalization are performed. At step 430, we generate three new files, namely SDF_subj.nt, SD_F-prop.nt, and SDF_obj.nt, by independently sorting file SDF.nt along the subjects, properties and objects of the triples in SDF.nt, respectively. At step 440, we select the SDF_subj.nt file generated in the previous step, and use it to extract the type system of the current (i.e., input) dataset. A step 450, we use file SDF_subj.nt, file SDF_prop.nt, and file SDF_obj.nt to collect respective metrics.

Each of the steps in method 400 will now be described in further detail.

Step 410. For some of the datasets (e.g., LUBM), the dataset triples were distributed over a (large) number of files. Therefore, the first step in our procedure is to assemble all the triples into a single file. Hereafter, we use the dataset-independent file name SDF.rdf (Single Dataset File) to refer to this file.

Step 420. We also perform some data cleaning and normalization. In more detail, some of the real datasets include a small percentage of triples that are syntactically incorrect. In this stage, we identify such triples, and we either correct the syntax, if the fix is obvious (e.g., missing quote or angle bracket symbols), or we drop the triple from consideration, when the information in the triple is incomplete. We also drop triples in a reified form (e.g., as in UniProt) and normalize all the datasets by converting all of them in the N-Triples format, which is a plain text RDF format, where each line in the text corresponds to a triple, and each triple is represented by the subject, property and object separated by space and the line terminates with a full stop symbol. We refer to SDF.nt as the file with the N-Triples representation of file SDF.rdf.

Step 430. We generate three new files, namely SDF_subj.nt, SDF_prop.nt, and SDF_obj.nt, by independently sorting file SDF.nt along the subjects, properties and objects of the triples in SDF.nt. Each sorted output file is useful for different types of collected metrics, and the advantage of sorting is that the corresponding metrics can be collected by making a single pass of the sorted file. Although the sorting simplifies the computation cost of metrics, there is an initial considerable overhead since sorting files with billions of triples that occupy many gigabytes (GBs) on disk require large amounts of memory and processing power (for some datasets, each individual sorting took more than two days in a dual processor server with 24 GB of memory and 6 TB of disk space). However, the advantage of this approach is that sorting need only be done once. After sorting is done, metrics can be collected efficiently and new metrics can be developed that take advantage of the sort order. Another important advantage of sorting the SDF.nt file is that duplicate triples are eliminated during the sorting process. Such duplicate triples occur especially when the input dataset is originally split into multiple files.

Step 440. We select the SDF_subj.nt file generated in the previous step, and use it to extract the type system of the current dataset. The reason for extracting the type system will become clear hereinafter where we introduce the structuredness metrics.

Step 450. We use file SDF_subj.nt to collect metrics such as counting the number of subjects and triples in the input dataset, as well as detailed statistics about the outdegree of the subjects (i.e., the number of properties associated with the subject). We use file SDF_prop.nt to collect metrics such as the number of properties in the dataset as well as detailed statistics about the occurrences of each property. We use file SDF_obj.nt to collect metrics such as the number of objects in the dataset as well as detailed statistics about the indegree of the objects (i.e., the number of properties associated with the object).

Coverage and Coherence

In what follows, we formally define the notion of structuredness (through the coverage and coherence metrics) and show the values of these metrics for the datasets introduced in the previous section.

Intuitively, the level of structuredness of a dataset D with respect to a type T is determined by how well the instance data in D conform to type T. Consider for example the dataset D of RDF triples in FIG. 5. That is, FIG. 5 is a representation 500 of a dataset D to which the present principles may be applied, according to an embodiment of the present principles. For simplicity, assume that the type T of these triples has properties name, office and ext. If each entity (subject) in D sets values for most (if not all) of the properties of T, then all the entities in D have a fairly similar structure that conforms to T. In this case, we can say that D has high structuredness with respect to T. This is indeed the case for the dataset D in FIG. 5. Consider now a dataset Dm that consists of the union D∪D' of triples in FIG. 5 and FIG. 6. FIG. 6 is a representation 600 of a dataset D' to which the present principles may be applied, according to an embodiment of the present principles. For illustration purposes, consider a type Tm with properties major and GPA, in addition to the properties of T. Dataset Dm has low structuredness with respect to Tm. To see why this is the case, notice that type Tm bundles together entities with overlapping properties. So, while all entities in Dm have a value for the name property, the first three entities (those belonging to dataset D) set values only for the office and ext properties, while the last three entities (those belonging to dataset D') only set values for the major and GPA properties. The objective of our work is to measure the level of structuredness of a dataset (whatever it is), and to generate datasets with a desired (high or low) structuredness level for the purposes of benchmarking. In what follows, we formally define structuredness and show how it can be measured.

Given a type T and a dataset D, let PT denote the set of all properties (attributes) of T, IT, D denote the set of all instances (entities) of type T in dataset D, and OCp, IT, D the number of occurrences of a property p∈PT, i.e., the number of times property p has its value set, in the instances IT, D of T. Referring back to FIG. 5, for the type and dataset defined there, PT=name, office, ext is equal to person0, person1, person2, while OCoffice, T is equal to 2 (since property office is not set for the third entity in dataset D), and similarly OCmajor, T is equal to 1.

DEFINITION 1. We define the coverage $CV_{T,D}$ of a type T on a dataset D as $$CV_{T,D} = \forall p \in PT OC_{p,IT,D} \times IT,D \quad (1)$$

Figure 7:
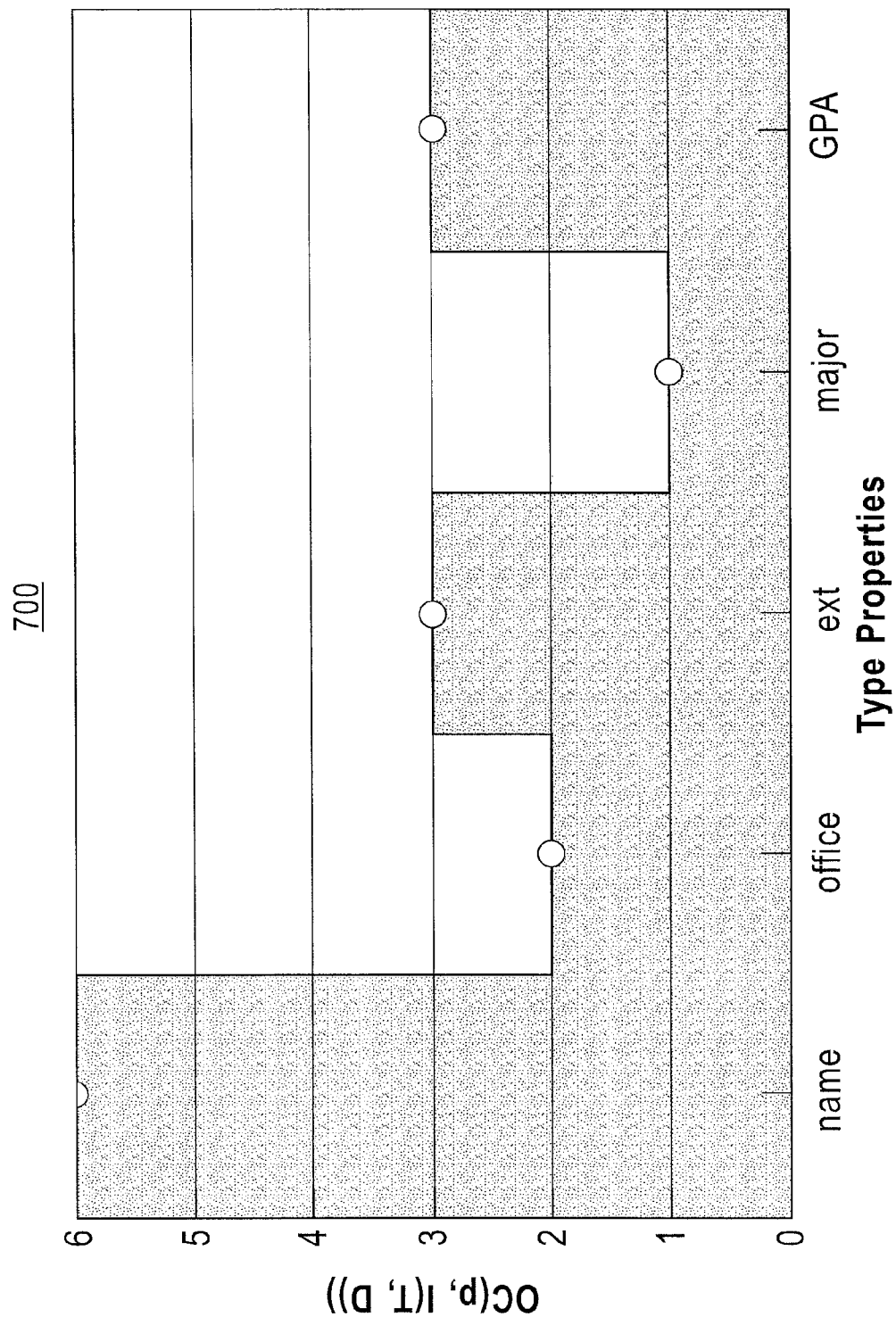
FIG. 7 is a plot 700 of the number of times a particular property p has its value set, in all instances of type Tm in dataset Dm, in accordance with an embodiment of the present principles.

To understand the intuition behind coverage, consider FIG. 7. FIG. 7 is a plot 700 of the number of times a particular property p has its value set, in all instances of type Tm in dataset Dm, in accordance with an embodiment of the present principles. In particular, FIG. 7 considers the type Tm and dataset Dm, as defined by FIGS. 5 and 6. Note that PTm=5, since there are five properties in the combined type system, and ITm,Dm=6 for the six person instances. For each property p, the figure plots $OC_{p,ITm,Dm}$. So, for example, for property name $OC_{name, ITm,Dm}$ is equal to 6, while for property major $OC_{major, ITm,Dm}$ is equal to 1. Now, as mentioned above, the structuredness of a type depends on whether the instances of the type set a value for all its properties. So, for a dataset Dm of Tm with perfect structuredness, every instance of the type in Dm sets all its properties, that is, OCp,ITm,Dm is equal to ITm,Dm, for every property p∈PTm. Then, in FIG. 7 perfect structuredness translates to the area covered by PTm×ITm,Dm, i.e., the area corresponding to the rectangle of the whole FIG. 7 (this is also the denominator in the computation of CVTm,Dm). In general, however, not all properties will be set for every instance. Then, the shaded area in FIG. 7 (computed by the numerator in the computation of CVTm,Dm) corresponds to the current level of structuredness of Dm with respect to Tm. Given the above, the formula of the coverage CVTm,Dm above is essentially an indication of the structuredness of Dm with respect to Tm normalized in the [0, 1] interval (with values close to 0 corresponding to low structuredness, and values close to 1 corresponding to perfect structuredness). In our specific example, the value of the computed coverage for CVTm,Dm is equal to 6+2+3+1+330=0.5 which intuitively states that each instance of type Tm in dataset Dm only sets half of its properties.

Formula 1 considers the structuredness of a dataset with respect to a single type. Obviously, in practice a dataset D has entities from multiple types, with each entity belonging to at least one of these types (if multiple instantiation is supported). It is quite possible that dataset D might have a high structuredness for a type T, say CVT, D=0.8, and a low structuredness for another type T', say CVT', D=0.15. But then, what is the structuredness of the whole dataset with respect to our type system (set of all types) T? We propose a mechanism to compute this, by considering the weighted sum of the coverage CVT, D of individual types. In more detail, for each type T, we weight its coverage using the following formula:

$$WTCVT,D = PT+IT,D \forall T \in TPT+IT,D \quad (2)$$

where PT is the number of properties for a type T, IT, D is the number of entities in D of type T, and the denominator sums up these numbers for all the types in the type system T. The weight formula has a number of desirable properties: It is easy to see that if the coverage CVT, D is equal to 1, for every type T in T, then the weighted sum of the coverage for all types T in T is equal to 1. The formula also gives higher weight to types with more instances. So, the coverage of a type with, say a single instance, has a lower influence in the computation of structuredness of the whole dataset, than the coverage of a type with hundreds of instances. This also matches our intuition that types with a small number of instances are usually more structured than types with larger number of instances. Finally, the formula gives higher weight to types with a larger number properties. Again, this matches our intuition that one expects to find less variance in the instances of a type with, say only two properties, than the variance that one encounters in the instances of a type with hundreds of properties. The latter type is expected to have a larger number of optional properties, and therefore if the type has high coverage, this should carry more weight than a type with high coverage which only has two properties.

We are now ready to compute the structuredness, hereinafter termed as coherence, of a whole dataset D with respect to a type system T (to avoid confusion with the term coverage which is used to describe the structuredness of a single type).

DEFINITION 2. We define the coherence CHT, D of a dataset D with respect to a type system T as follows:

$$CHT,D = \forall T \text{ in } TWTCVT,D \times CVT,D \quad (3)$$

Computing Coherence

To compute the coherence of an input dataset, we consider file SDF_subj.nt (see herein above). Remember that the file contains all the triples in the dataset (after cleaning, normalization and duplicate elimination) expressed in the N-Triples format. We proceed by annotating each triple in SDF_subj.nt with the type of triple's subject and object. This process converts each triple to a quintuple. We call the resulted file SDF_WT.nt (for Single Dataset File With Types). Once more pass of the SDF_WT.nt file suffices to collect for each type T of the dataset the value of OCp,IT, D, for each property p of T. At the same time, we compute the values for PT and IT, D and at the end of processing the file we are in a position to compute CVT, D, WTCVT, D and finally CHT, D.

Benchmark Generation

There are two overall methods to be considered in generating benchmarks with structuredness that better represent real datasets. The first method, similar to the approach taken by the developers of LUBM, SP$^2$Bench and BSBM is to generate a dataset with a given coherence and size bottom up. The main issue with this approach is that the generated benchmark is domain specific. In all the aforementioned benchmark datasets, the relationships and relative cardinalities between different types come from knowledge of the target domain and are hard-coded into the generation algorithms and are not controllable by the user. For instance, the relative cardinalities of professors and students or students and courses in LUBM are a feature of the generation algorithm and are not available to the user generating the benchmark.

The second method, which applies to any domain for which there already is a benchmark, involves taking an already generated benchmark dataset, and producing a dataset with a specified smaller size and coherence. Ideally, we would like to take a dataset D generated from an existing benchmark and produce a dataset D' with a specified size D'<D and a specified coherence CHT, D'<CHT, D. We believe this latter method has a larger impact in practice, since it can be used on top of any already existing benchmark or real-world dataset.

The central idea behind our approach is that under certain circumstances we can estimate the impact that removing a set of triples with the same subject and property can have on coherence. Let s,p,o be a triple from D and let Ts=Ts1, . . . , Tsn be the set of types of instance s (we remind the reader that a single instances s can have multiple types, for example a GraduateStudent can also be a ResearchAssistant). We are going to compute the impact on coherence of removing all triples with subject s and property p from D, under the following two assumptions:

(Assumption 1) We are not completely removing property p from any of the types Ts1, . . . , Tsn. That is, after the removal, there will still exist instances for each of these types that still have property p.

(Assumption 2) We are not completely removing instance s from the dataset. This can be very easily enforced by keeping the triples s, rdf:type, Tsi in the dataset.

Under these two assumptions, note that the weights WTCVT, D for the coverage of any type T∈Ts do not change since we are keeping the same number of properties and instances for each such type. For each type T∈Ts, we can compute the new coverage as follows:

$$CVT,D' = \forall q \in PT - p OCq,IT,D + OCp,IT,D - 1 PT \times IT,D \quad (4)$$

Note that there is one less instance (specifically, s) that has property p for type T. It is evident from this formula that removing all triples with subject s and property p will decrease the coverage of all types T∈Ts by CVT, D−CVT, D'.

Consequently, we can also compute the coherence CHT, D' of D after removing these triples by simply replacing CVT, D with CVT, D' for all types T in Ts. Finally, we compute the impact on the coherence of D of the removal as follows:

$$\text{coin} Ts, p = CHT, D - CHT, D'$$

Let us illustrate this process with an example. Consider the dataset Dm introduced in FIG. 5 and assume we would like to remove the triple (person1, ext, x5304) from Dm. Then the new coverage for the type person in this dataset becomes 6+2+2+1+330≈0.467, hence the impact on the coverage of person is approximately 0.5−0.467=0.033. In this example, Dm contains a single type, therefore the coherence of the dataset is the same as the coverage for person, which brings us to coin person, ext≈0.033.

Benchmark Generation Algorithm

We now describe our approach to generate benchmark datasets of desired coherence and size by taking a dataset D and producing a dataset D' ⊂ D such that CHT, D'=γ and D'=σ where γ and σ are specified by the user. To do this, we need to determine which triples need to removed from D to obtain D'. We will formulate this as a integer programming problem and solve it using an existing integer programming solver.

Previously herein, for a set of types S ⊆ T and a property p, we have shown how to compute coinS, p, which represents the impact on coherence of removing all triples with subjects that are instances of the types in S and properties equal to p. For simplification, we will overload notation and use coinS, p to denote the number of subjects that are instances of all the types in S and have at least one triple with property p, i.e., as follows:

$$\text{coin} S, p = s \in T \in S\ IT, D \exists s, p, v \in D$$

Our objective is to formulate an integer programming problem whose solutions will tell us how many "coins" (triples with subjects that are instances of certain types and with a given property) to remove to achieve the desired coherence γ and size σ. We will use XS,p to denote the integer programming variable representing the number of coins to remove for each type of coin. In the worst case, the number of such variables (and corresponding coin types) for D can be 2Tπ, where T is the number of types in the dataset and π is the number of properties in the dataset. However, in practice, many type combinations will not have any instances, for example in LUBM, we will not find instances of UndergraduateStudent that are also instance of Course or Department. For LUBM, we found that although there are 15 types and 18 properties, we only have 73 valid combinations (sets of types and property with at least one coin available).

To achieve the desired coherence, we will formulate the following constraint and maximization criteria for the integer programming problem:

$$S \subseteq T, p\text{coin}S, p \times XS, p \leq CHT, D - \gamma \quad (C1)$$

$$\text{MAXIMIZES} \subseteq D, p\text{coin}S, p \times XS, p \quad (M)$$

Inequality C1 states that the amount by which we decrease coherence (by removing coins) should be less than or equal than the amount we need to remove to get from CHT, D (the coherence of the original dataset) to γ (the desired coherence). Objective function M states that the amount by which we decrease coherence should be maximized. The two elements together ensure that we decrease the coherence of D by as much as possible, while not going below γ.

We will also put lower and upper bounds on the number of coins that can be removed. Remember that assumption (A1) required us not to remove any properties from any types, so we will ensure that at least one coin of each type remains. Furthermore, we will enforce assumption (A2) about not removing instances from the dataset by always keeping triples with the rdf:type property as follows:

$$\forall S \subseteq T, p0 \leq XS, p \leq \text{coin}S, p - 1 \quad (C2)$$

Achieving the desired size σ is similar, but requires an approximation. Under the simplifying assumption that all properties are single-valued (i.e., there is only one triple with a given subject and a given property in D), we could write the following constraint:

$$S \subseteq T, pXS, p = D - \sigma$$

This equation would ensure that we remove exactly the right number of coins to obtain size a assuming that all properties are single-valued (meaning one coin represents exactly one triple). However, this assumption does not hold for any of the datasets we have seen. In particular, for LUBM, many properties are multi-valued. As an example, a student can be enrolled in multiple courses, a paper has many authors, and so forth. We will address this by computing an average number of triples per coin type, which we denote by ctS,p, and relaxing the size constraint as follows:

$$1 - \rho \times D - \sigma \leq S \subseteq T, pXS, p \times ctS, p \quad (C3)$$

$$S \subseteq T, pXS, p \times ctS, p \leq 1 + \rho \times D - \sigma \quad (C4)$$

In these two constraints, ρ is a relaxation parameter. The presence of ρ is required because of the approximation we introduced by using the average number of triples per coin. In practice, setting p helped us tune the result of our algorithm closer to the target coherence and size.

Figure 8:
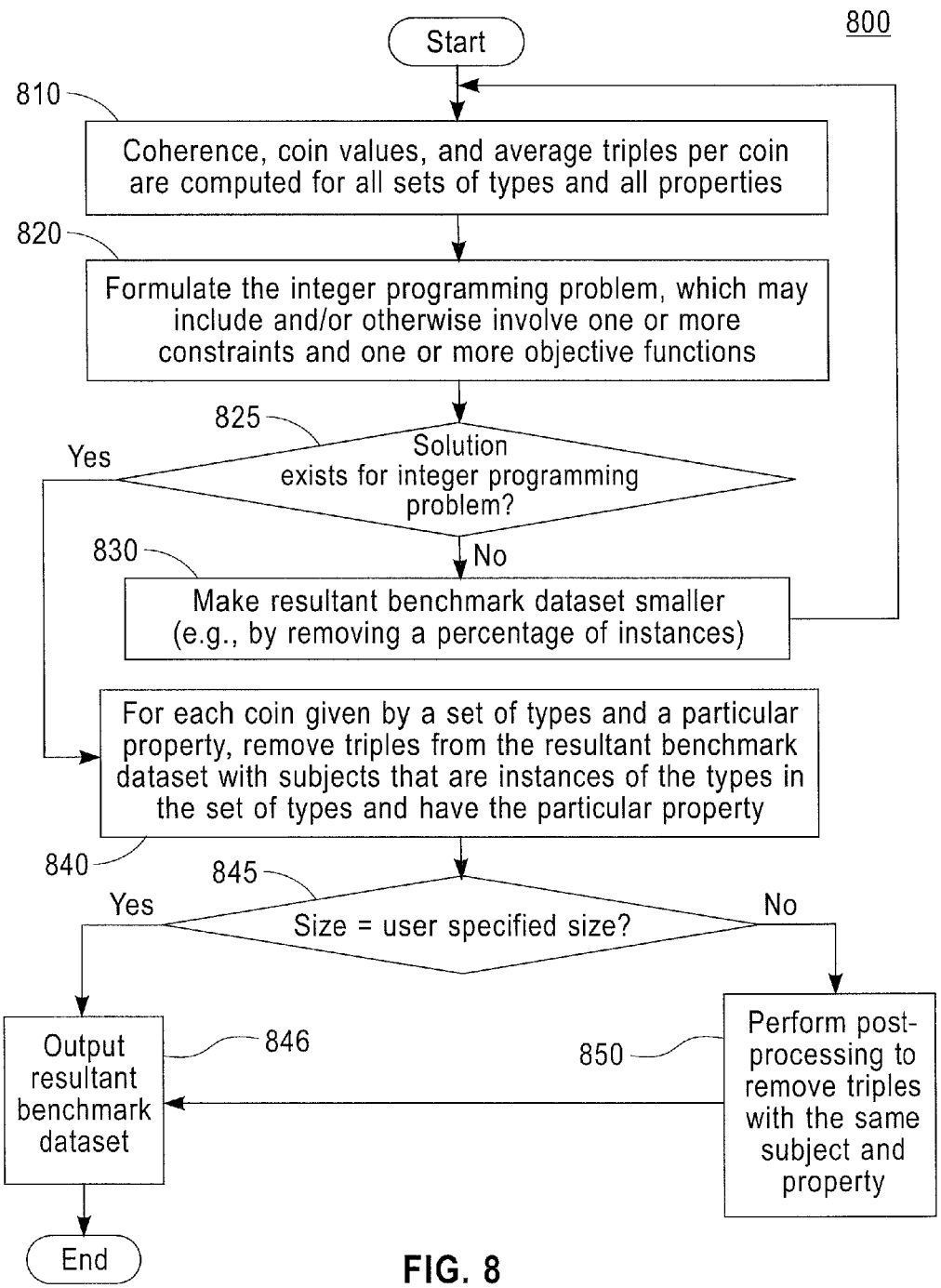
FIG. 8 is a flow diagram showing another exemplary method 800 for generating resource description framework benchmarks, according to an embodiment of the present principles.

FIG. 8 shows a flow diagram illustrating another exemplary method 800 for generating resource description framework benchmarks, according to an embodiment of the present principles. Method 800 is essentially another representation of method 300. In particular, method 800 also encompasses, as contrasted to method 300, the situation where the integer programming problem does not have a solution. At step 810, the coherence and coin values and average triples per coin are computed for all sets of types and all properties. At step 820, the integer programming problem is formulated. The integer programming problem may include and/or otherwise involve one or more constraints and/or one or more objective functions. At step 825, it is determined whether or not the integer programming problem has a solution. If so, the method 800 proceeds to step 840. Otherwise, the method 800 proceeds to step 830. At step 830, the dataset is made smaller responsive to a lack of solution to the integer programming problem, for example, by removing a percentage of instances, and the method returns to step 810. At step 840, for each coin given by a set of types and a particular property, triples with subjects that are instances of the types in the set of types and have the particular property are removed from the resultant benchmark dataset. At step 845, it is determined whether or not the size of the resultant benchmark dataset is equal to a user specified size. If so, then the method 800 proceeds to step 846. Otherwise, the method 800 proceeds to step 850. At step 846, the resultant benchmark dataset is output. At step 850, post-processing is performed to remove triples with the same subject and property, and the method 800 then proceeds to step 846 to output the (post-processed) resultant benchmark dataset.

We now further describe some of the steps of the method 800 that generates a benchmark dataset of desired coherence γ and size σ from an original dataset D:

(Step 810) Compute the coherence CHT, D and the coin values coinS, p and average triples per coin ctS,p for all sets of types S⊆T and all properties p.

(Step 820) Formulate the integer programming problem by writing constraints C1, C2, C3, C4 and objective function M. Solve the integer programming problem.

(Step 830) If the problem did not have a solution, then try to make the dataset smaller by removing a percentage of instances and continue from Step 1.

(Step 840) If the problem had a solution, then for each coin given by S and p, remove triples with XS,p subjects that are instances of types in S and have property p.

(Step 850) If the resulting dataset size is larger than σ, perform post-processing by attempting to remove from triples with the same subject and property.

We have previously explained in detail how Steps (810) and (820) can be executed. Step (830) is an adjustment in case there is no solution to the linear programming problem. Remember that assumption (A2) required us not to remove entire instances from the dataset if the integer programming formulation is to produce the correct number of coins to remove. In practice, we found that for certain combinations of γ and σ, the integer programming problem does not have solutions, such as particularly for cases where the desired coherence γ is high, but the desired size σ is low (i.e., we have to remove many coins, but we should not decrease coherence much). For these cases, we found that we can remove entire instances from D first to bring down its size, then reformulate the integer programming problem and find a solution. The intuition behind this approach is that when starting with original datasets of very high coherence (e.g., LUBM, TPC-H, etc.), removing instances uniformly at random will not decrease coherence much (if at all), since the coverage for all types is high, but it can decrease dataset size to a point where our integer programming approach finds a solution.

To perform this removal of instances effectively, we needed to understand how many instances to remove from the original dataset to have a high probability of finding a solution on the new dataset. In our experiments, the integer programming problem always had a solution for σD≈γ CHT, D. Therefore, we want to remove enough instances as to have the size of our new dataset approximately CHT, Dγ×σ. Assuming that the dataset size is proportional to the number of instances (we found this to be true for all datasets we examined), then we should remove uniformly at random a proportion of 1-CHT, Dγ×σD instances to arrive at a dataset for which we have a good chance of solving the integer programming problem. After this process, we must restart the algorithm since the coherence and the numbers of coins for the dataset after the instance removal may be different than those of the original dataset.

In Step (840), we perform the actual removal of triples according to the solutions to the integer programming problem. Step (850) is a post-processing step that attempts to compensate for the approximation introduced by constraints C3 and C4 of the integer programming problem. Specifically, if the solution we obtain after Step (840) has a size higher than σ, then we can compensate by looking at triples with the same subject and property.

Note that based on the way we have defined coverage for types, the formula measures whether instances have at least one value for each property of that type. Therefore, if a property is multi-valued, we can safely remove the triples including extra values (ensuring that we keep at least one value), and therefore reduce the size of the dataset. While this step is optional, it can improve the match between σ and the actual size of the resulting dataset. Note that the algorithm presented in this section performs at least two passes through the original dataset D. The first pass is performed in Step (810) to compute coherence and coin values and the average number of triples per coin. The second pass is performed in Step (840), where coins are removed from D to generate the desired dataset. If the integer programming problem does not have a solution, then at least four passes are required: one pass in Step (810), one pass in Step (830) to remove instances, a third pass in Step (810) to compute coherence and coin values after instance removal and finally a fourth pass in Step (840) to remove coins from the dataset. In addition, in either case there may be an additional pass over the resulting dataset to adjust for size (Step 850).

In addition, we note that in certain embodiments, certain ones of the triples in the input dataset marked by a user are left unchanged from the input dataset to the resultant benchmark dataset so that the marked triples are identical in the input dataset and the resultant bench dataset. This essentially guarantees to the user that after changes are made to the input data set in order to derive the resultant benchmark dataset, that the marked triples will still be there (i.e., still exist in the resultant benchmark dataset).

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A non-transitory computer readable storage medium comprising a computer readable program, wherein the computer readable program when executed on a computer causes the computer to perform the following:

deriving a resultant benchmark dataset with a user specified size and a user specified coherence from and with respect to an input dataset of a given size and a given coherence;

wherein said deriving step comprises:

computing respective coins, each representing a respective value by which the coherence of the input dataset increases or decreases with respect to deriving the resultant benchmark dataset, when respectively adding to or removing from the input dataset all triples of subject-property-object with subjects that are instances of types in a plurality of type sets and with properties equal to a particular set of properties, each of the respective coins being computed with respect to all of the types in only a respective one of the plurality of type sets and with respect to only a respective one of the properties in the particular set of properties;

determining an amount of the triples, as represented by the respective coins, to be added or removed from the input dataset to derive the resultant benchmark dataset; and adding or removing the determined amount of the triples from the input dataset so as to derive the resultant benchmark dataset.

2. The non-transitory computer readable storage medium of claim 1, wherein the determining is performed with respect to two constraints when at least one of the user specified size is smaller than the given size and the user specified coherence is smaller than the given coherence, a first one of the two constraints being that instances of each of the types in the set of types with the same property will still exist in the resultant benchmark dataset with respect to the input dataset, the second one of the two constraints being that at least one of the instances of the same subject is maintained in the resultant benchmark dataset with respect to the input dataset.

3. A system for deriving a resultant benchmark dataset from and with respect to an input dataset of a given size and a given coherence, the system comprising:

a coin calculator for computing respective coins, each representing a respective value by which the coherence of the input dataset increases or decreases with respect to deriving the resultant benchmark dataset, when respectively adding or removing from the input dataset all triples of subject-property-object with subjects that are instances of types in a plurality of type sets and with properties equal to a particular set of properties, each of the respective coins being computed with respect to all of the types in only a respective one of the plurality of type sets and with respect to only a respective one of the properties in the particular set of properties;

a triple amount determiner for determining an amount of the triples, as represented by the respective coins, to be added or removed from the input dataset to derive the resultant benchmark dataset with a user specified size and a user specified coherence; and a triple modifier for adding or removing the determined amount of the triples from the input dataset so as to derive the resultant benchmark dataset, wherein the coin calculator, the triple amount determiner, and the triple modifier are implemented by a hardware processor and a memory device.

* * * * *